United States Patent
Kelly et al.

(10) Patent No.: US 8,687,948 B2
(45) Date of Patent: *Apr. 1, 2014

(54) APPARATUS AND A RECORD CARRIER FOR, AND A METHOD OF RECORDING A SEQUENCE OF VIDEO DATA SIGNALS

(75) Inventors: Declan Patrick Kelly, Eindhoven (NL); Wilhelmus Jacobus Van Gestel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1943 days.

This patent is subject to a terminal disclaimer.

(21) Appl. No.: 10/502,811

(22) PCT Filed: Jan. 17, 2003

(86) PCT No.: PCT/IB03/00126
§ 371 (c)(1),
(2), (4) Date: Jul. 27, 2004

(87) PCT Pub. No.: WO03/065717
PCT Pub. Date: Aug. 7, 2003

(65) Prior Publication Data
US 2005/0084250 A1    Apr. 21, 2005

(30) Foreign Application Priority Data
Feb. 1, 2002   (EP) .................................. 02075462

(51) Int. Cl.
*H04N 5/92*   (2006.01)
*H04N 5/84*   (2006.01)
*H04N 5/89*   (2006.01)
*H04N 5/917*  (2006.01)

(52) U.S. Cl.
USPC ........... 386/326; 386/328; 386/329; 386/330; 386/331; 386/332; 386/334

(58) Field of Classification Search
USPC ............. 386/95, 46, 111–112, 125–126, 326, 386/328, 329, 330, 331, 332, 334
See application file for complete search history.

(56) References Cited

U.S. PATENT DOCUMENTS

| | | | | |
|---|---|---|---|---|
| 5,742,361 | A  * | 4/1998 | Nakase et al. | 375/240.26 |
| 6,269,218 | B1 * | 7/2001 | Lim et al. | 386/248 |
| 6,658,056 | B1 * | 12/2003 | Duruoz et al. | 375/240 |
| 6,909,743 | B1 * | 6/2005 | Ward et al. | 375/240.01 |

FOREIGN PATENT DOCUMENTS

| | | | | |
|---|---|---|---|---|
| WO | 0028544 | 5/2000 | ........... | G11B 27/034 |
| WO | WO0028544 | * | 5/2000 | |

* cited by examiner

*Primary Examiner* — Daquan Zhao (57) ABSTRACT

An apparatus for recording a sequence of video data signals on a record carrier has been proposed. The apparatus comprises input means (1) for receiving video data signals, generating means (100) for generating characteristic point information signals, processing means (100) for processing the characteristic point information signals for a plurality of characteristic points into a sequence of characteristic points information signals (CPI) and writing means (102) for writing the sequence of video data signals and the sequence of characteristic points information signals on the record carrier. The characteristic point information signals identify a characteristic point in the sequence of video data signals. Various measures are proposed in relation to the CPI aiming at improving quality of trickplay and random access playback operations.

9 Claims, 7 Drawing Sheets

APPARATUS AND A RECORD CARRIER FOR, AND A METHOD OF RECORDING A SEQUENCE OF VIDEO DATA SIGNALS

The invention relates to an apparatus for recording a sequence of video data signals on a record carrier, the sequence of video data signals comprising pictures of an intra-picture type coded without reference to other pictures and pictures of an inter-picture type coded with reference to other pictures, the apparatus comprising:
  input means for receiving video data signals and;
  generating means for generating characteristic point information signals, the characteristic point information signals identifying a characteristic point in the sequence of video data signals, the characteristic point being related to a picture selected from the pictures of the intra-picture type and the pictures of the inter-picture type, the characteristic point information signals comprising a block of information, the block of information comprising:
    position data defining a position of the characteristic point in the sequence of video data signals; and
    identification data identifying the characteristic point;
  processing means for processing the characteristic point information signals for a plurality of characteristic points into a sequence of characteristic points information signals; and
  writing means for writing the sequence of video data signals and the sequence of characteristic points information signals on the record carrier.

The invention further relates to an apparatus for reproducing a sequence of video data signals comprising pictures of an intra-picture type coded without reference to other pictures and pictures of an inter-picture type coded with reference to other pictures, using for the sequence of video data signals a corresponding sequence of characteristic points information signals comprising a characteristic point information signals for a plurality of characteristic points, the characteristic point information signals identifying a characteristic point in the sequence of video data signals, the characteristic point being related to a picture selected from the pictures of the intra-picture type and the pictures of the inter-picture type, the characteristic point information signals comprising a block of information which comprises:
  position data defining a position of the characteristic point in the sequence of video data signals;
  identification data identifying the characteristic point; the apparatus comprising:
    input means for receiving the sequence of video data signals and a corresponding sequence of characteristic points information signals;
    extracting means for extracting the block of information from the sequence of characteristic points information signals;
    processing means for processing the sequence of video data signals into video data signals using the block of information.

In addition, the invention relates to a method of generating a sequence of information signals concerning characteristic points in a sequence of video data signals comprising pictures of an intra-picture type coded without reference to other pictures and pictures of an inter-picture type coded with reference to other pictures, in which for a characteristic point related to a picture selected from the pictures of the intra-picture type and the pictures of the inter-picture type, a block of information is generated, the block of information comprising:
  position data defining a position of the characteristic point in the sequence of video data signals; and
  identification data identifying the characteristic point.

Furthermore, the present invention relates to a record carrier comprising a sequence of video data signals, the sequence of video data signals comprising pictures of an intra-picture type coded without reference to other pictures and pictures of an inter-picture type coded with reference to other pictures, the record carrier further comprising for the sequence of video data signals a corresponding sequence of characteristic points information signals comprising a characteristic point information signals for a plurality of characteristic points, the characteristic point information signals identifying a characteristic point in the sequence of video data signals, the characteristic point being related to a picture selected from the pictures of the intra-picture type and the pictures of the inter-picture type, the characteristic point information signals comprising a block of information which comprises:
  position data defining a position of the characteristic point in the sequence of video data signals;
  identification data identifying the characteristic point.

The development of the large-capacity rewritable media, like DVD+RW or DVD−RW optical discs, offers a unique technology for storing and accessing full-motion video data. As these data require a large amount of storage capacity, various types of video compression algorithms are used to reduce the amount of necessary storage capacity. Generally, these algorithms use a concept referred to as inter-picture compression, which involves storing only the differences between successive pictures in the data file. Inter-picture compression stores the entire image of a key picture or a reference picture, generally in a moderately compressed format. Successive pictures are compared with the key picture, and only the differences between the key picture and the successive pictures are stored. Periodically, such as when new scenes are displayed, new key pictures are stored, and subsequent comparisons begin from this new reference point.

A compression standard referred to as MPEG (Moving Pictures Experts Group) compression is a set of methods for compression and decompression of full motion video pictures which uses the inter-picture compression technique described above. The key, intra-pictures are referred to as I-pictures 23. The inter-pictures are divided into two groups: inter-pictures coded using only past reference elements which are referred to as P-pictures 25 and inter-pictures coded using a past and/or future reference, referred to as B-pictures 24.

An embodiment of a method described in the opening paragraph is known from published international patent application WO 00/28544, which teaches how to extract pointers to the I-pictures and to the P-pictures in a sequence of video data. Information concerning these pointers constitutes a sequence of characteristic points information, hereinafter also referred to as a CPI.

In general, a CPI is used to determine the location of relevant data elements in the sequence of video data, without having to read and analyze the sequence itself. This is important for controlling several different system operations like trickplay operation, such as fast forward and fast reverse play, or random access playback, when a user may require playback to start at some particular time position in the sequence of video data.

The method disclosed in WO 00/28544 is intended for self-encoded sequences of video data, i.e. the sequences encoded by the same device which creates a corresponding CPI, using a restricted format of the MPEG data. For recording of digital TV broadcasts or other sequences of video data coded externally, a less restricted MPEG coding format is employed.

In particular, in an MPEG sequence of video data there is a sequence header that defines the parameters for the sequence including coding parameters used in (de)compression of the video data, such as quantization matrices. The sequence header is present at the start of the MPEG sequence and may be repeated throughout the sequence. Typically the sequence header is repeated before every I-picture. When the sequence header is repeated, only the quantization matrices may be changed. However, in a system with editing it is possible that other sequence header parameters change at the edit points.

The known method identifies in a CPI starting and ending points for a particular I-picture in the MPEG sequence. These points are called I_start and I_end, respectively. Because the sequences are self-encoded it was assumed that all I-pictures would be preceded by the sequence header and so all I-pictures are entry points, i.e. a decoder can begin decoding at any I-picture and be sure that it can decode correctly. However, in the case of a digital TV recording, it is not mandatory for an I-picture to be preceded by the sequence header. If the decoder tries to decode such an I-picture without having seen the previous sequence header then it will use the wrong coding parameters, if they have changed, e.g. the wrong quantization matrices or, after an edit point, other parameters. Therefore, in a digital TV recording the I_start/I_end CPI points can only point to I-pictures with sequence header.

To allow random access in digital TV broadcasts, the sequence header needs to be repeated quite often in the sequence but it could happen that the repetition rate is not high enough to allow high quality trickplay. An example could be a broadcast recording which repeats the sequence header every 5 seconds. If only pointers to I-pictures with sequence headers are included in a CPI and I-picture only trickplay is performed with 5 pictures per second, then the minimum trickplay speed is limited to 25 times normal playback speed.

It is a first object of the invention to provide an apparatus for recording a sequence of video data signals of the type described in the opening paragraph which is capable of generating and recording a new type of CPI that allows for performing high quality trickplay and random access playback.

It is a second object of the invention to provide an apparatus for reproducing a sequence of video data signals of the type described in the opening paragraph which is capable of receiving and processing a new type of CPI, so it can perform high quality trickplay and random access playback.

It is a third object of the invention to provide a method of the type described in the opening paragraph which can be applied to generate a new type of CPI that allows for performing high quality trickplay and random access playback.

It is a fourth object of the invention to provide a record carrier of the type described in the opening paragraph which comprises a new type of CPI containing controlling information that allows a reproducing apparatus to perform high quality trickplay and random access playback.

The first object is, according to the invention, realized by an apparatus for recording characterized in that the generating means are designed to generate the characteristic point information signals, in which the identification data comprises information related to presence of a sequence header, the sequence header comprising information defining coding parameters for the sequence of video data signals.

The embodiment according to the invention is advantageous in that the generated CPI may now contain all I-pictures 23 from the MPEG sequence. It ensures that a decoder always, i.e. regardless whether the sequence is self-encoded or not, knows where to find coding parameters, while performing random access playback or trickplay.

An embodiment of the apparatus for recording is characterized in that the generating means are designed to generate the characteristic point information signals, in which the identification data comprises information related to one of the following conditions:
- the picture is of the intra-picture type 23 and is preceded by the sequence header;
- the picture is of the intra-picture type 23 without the sequence header;
- the picture is of the inter-picture type 25 and is preceded by the sequence header.

This embodiment is advantageous in that the generated CPI may now contain as many as necessary entries associated with P-pictures 25, which drastically improves trickplay performance.

A further embodiment, according to the invention, for the apparatus for recording is characterized in that the generating means are designed to generate the characteristic point information signals, in which the identification data comprises information related to a change of the coding parameters.

This embodiment is advantageous in that the generated CPI containing this information significantly improves performance of a decoder. During trickplay, a sequence header from a particular I-picture does not have to be read if there is no change of the coding parameters and the subsequent P-pictures can still be included. For reverse trickplay, a change in the coding parameters indicates that the preceding I-pictures use a different sequence header. Therefore the sequence header from the previous I-picture must be read before those P-pictures can be decoded.

The second object is, according to the invention, realized by an apparatus for reproducing characterized in that the extracting means are designed to retrieve the identification data comprising information related to presence of a sequence header, the sequence header comprising information defining coding parameters for the sequence of video data signals and the processing means are designed to use information related to presence of the sequence header.

This apparatus is advantageous in that during system operations like trickplay more pictures are available for presentation. In addition, the invention increases the number of entry points used in random access playback. Moreover, the invention allows for a proper decoding of all pictures related to CPI entries, as a decoder knows where to find the coding parameters.

An embodiment of the apparatus for reproducing, according to the invention, is characterized in that
the extracting means are designed to retrieve the identification data further comprising information related to one of the following conditions:
- the picture is of the intra-picture type 23 and is preceded by the sequence header;
- the picture is of the intra-picture type 23 without the sequence header; and
- the picture is of the inter-picture type 25 and is preceded by the sequence header.
the processing means are designed to use information related to the above conditions.

This embodiment is advantageous in that it facilities smooth multi-speed trickplay by making use of additional entries in a CPI associated with P-pictures.

Further embodiment of the apparatus for reproducing, according to the invention, is characterized in that the extracting means are designed to retrieve the identification data comprising information related to a change of the coding parameters; and the processing means are designed to use information related to the change of the coding parameters.

This embodiment is advantageous in that it improves performance of a decoder by decreasing the amount of time necessary to decode pictures.

The third object is, according to the invention, realized by a method characterized in that the block of information is generated to comprise in the identification data information related to presence of a sequence header, the sequence header comprising information defining coding parameters for the sequence of video data signals.

The fourth object is, according to the invention, realized by a record carrier characterized in that the identification data comprises controlling information related to presence of a sequence header, the sequence header comprising information defining coding parameters for the sequence of video data signals.

These and other aspects of the invention will be further elucidated and described with reference to the drawings, in which.

Figure 1:
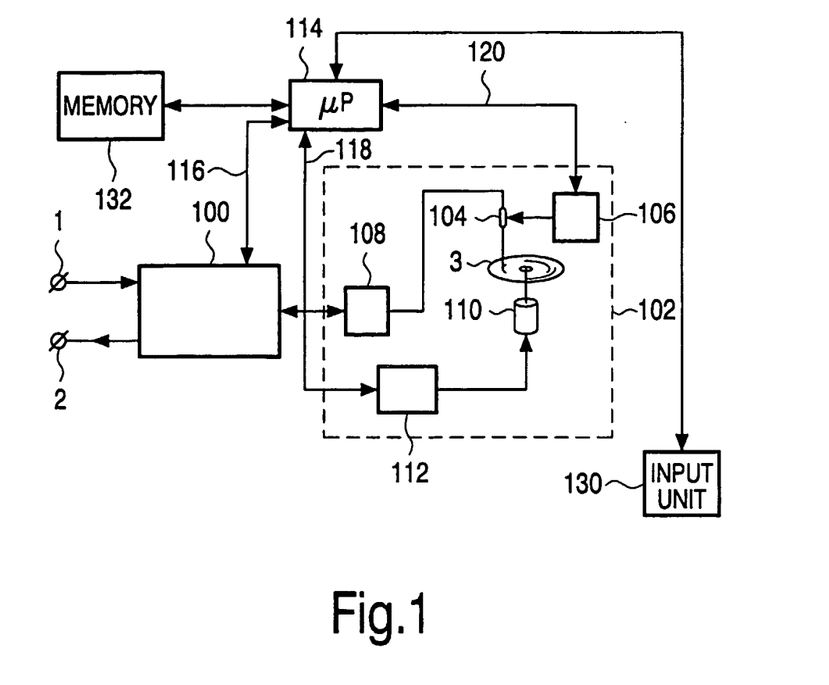
FIG. 1 shows an embodiment of the apparatus for recording a sequence of video data signals, in accordance with the invention.

FIG. 1 shows an embodiment of the apparatus for recording a sequence of video data signals, in accordance with the invention. The apparatus comprises an input terminal 1 for receiving video data signals and a video data signals processing unit 100. The signals processing unit 100 receives the video data signals via the input terminal 1 and processes the video data signals into a sequence of video data signals for recording the sequence of video data signals on a record carrier 3. Further, a read/write unit 102 is available. The read/write unit 102 comprises a read/write head 104, which is in the present example an optical read/write head for reading/writing the sequence of video data signals and a corresponding CPI from/on the record carrier 3. Further, positioning means 106 are present for positioning the head 104 in a radial direction across the record carrier 3. A read/write amplifier 108 is present in order to amplify the signal to be recorded and amplifying the signal read from the record carrier 3. A motor 110 is available for rotating the record carrier 3 in response to a motor control signal supplied by a motor control signal generator unit 112. A microprocessor 114 is present for controlling all the circuits via control lines 116, 118 and 120.

The signals processing unit 100 is further adapted to generate the corresponding CPI for the sequence of video data signals. To that purpose, the signals processing unit 100 is, as an example, capable of identifying position of an I-picture in the sequence of video data signals. It is also capable of detecting presence of a sequence header in the sequence of video data signals. Further, the signals processing unit 100 is capable of generating a block of information for a characteristic point corresponding to this I-picture, as shown by an example in FIG. 2. In this example the block of information has a length of 4 bytes and consists of: a 1-bit sequence header presence indicator 41 (SHI), a 13-bit presentation time stamp 42 (PTS) specifying a time during presentation of the sequence of video data when a particular picture is to be presented and an 18-bit source packet number 43 (SPN) specifying an address in the sequence of video data where the characteristic point is located.

The CPI can be temporarily stored in a memory 132, until the processing of the video data signals into the sequence of video data signals and, eventually, the subsequent recording on the record carrier 3, has been completed. Next, the CPI stored in the memory 132 can be recorded on the record carrier 3.

Another embodiment of the apparatus for recording the sequence of video data signals according to the invention is realized by adapting the read/write unit 102 to perform reading/writing of the sequence of video data signals and a corresponding CPI from/on the record carrier of a solid state memory type.

A further embodiment of the apparatus for recording the sequence of video data signals according to the invention is realized by adapting the signals processing unit 100 to facilitate identification of I-pictures 23 and P-pictures 25, in combination with detection of a sequence header in the sequence of video data signals. In addition, the signals processing unit 100 is capable of generating a block of information for a characteristic point, as shown by an example in FIG. 3. In this example the block of information has a length of 4 bytes and consists of: a 2-bit picture type indicator 44 (TYP), a 12-bit PTS 42 and an 18-bit SPN 43.

The CPI created by this embodiment contains three, new entry types called: Primary Entry Points, Secondary Entry Points and Dependant Entry Points, respectively. Primary Entry Points are points at which a decoder can start decoding without reference to any previous points in the sequence of video. Secondary Entry Points are points at which a decoder can start decoding as long as a picture corresponding to the previous Primary Entry Point was decoded. Dependant Entry Points are points for which corresponding pictures can only be decoded if a picture corresponding to the previous CPI entry, which can be either of the three types, was decoded.

These points are defined without reference to MPEG to highlight that they could be applied to other video coding methods with dependant parts.

The mapping to MPEG video is as follows: Primary Entry Points—points associated with I-pictures preceded by a sequence header, Secondary Entry Points—points associated with any of I-pictures (but typically only used for I-pictures without a sequence header), Dependant Points—points associated with P-pictures.

A next embodiment of the apparatus for recording the sequence of video data signals according to the invention is realized by adapting the signals processing unit 100 to detect changes in coding parameters between consecutive sequence headers. Further, the signals processing unit 100 is capable of generating a block of information for a characteristic point, as shown by an example in FIG. 4. In this example the block of information has a length of 4 bytes and consists of: a 2-bit TYP 44, a 1-bit coding parameters change indicator 45 (CPC), a 12-bit PTS 42 and a 17-bit SPN 43.

Yet another embodiment of the apparatus for recording the sequence of video data signals can be realized by providing an input unit 130 for receiving commands from a user. Such commands can be in a form of recording commands, e.g. identifying a characteristic point in the sequence of video data signals.

Figure 5:
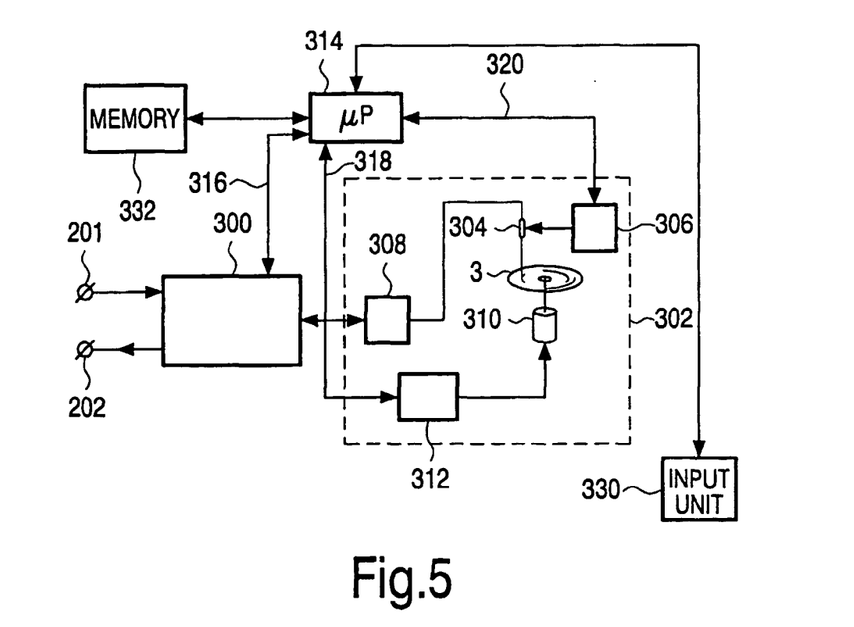
FIG. 5 shows an embodiment of the apparatus for reproducing a sequence of video data signals, in accordance with the invention.

FIG. 5 shows an embodiment of the apparatus for reproducing a sequence of video data signals from a record carrier 3, in accordance with the invention. The apparatus comprises a read unit 302, a signals processing unit 300 and an output terminal 202 for outputting video data signals. The read unit 302 comprises a read head 304, which is in the present example an optical read head for reading the sequence of video data signals from the record carrier 3. The signals processing unit 300 receives the sequence of video data signals from a read unit 302 and processes the sequence of video data signals into video data signals. Further, positioning means 306 are present for positioning the head 304 in a radial direction across the record carrier 3. A read amplifier 308 is present in order to amplify the signal read from the record carrier 3. A motor 310 is available for rotating the record carrier 3 in response to a motor control signal supplied by a motor control signal generator unit 312. A microprocessor 314 is present for controlling all the circuits via control lines 316, 318 and 320.

Figure 2:
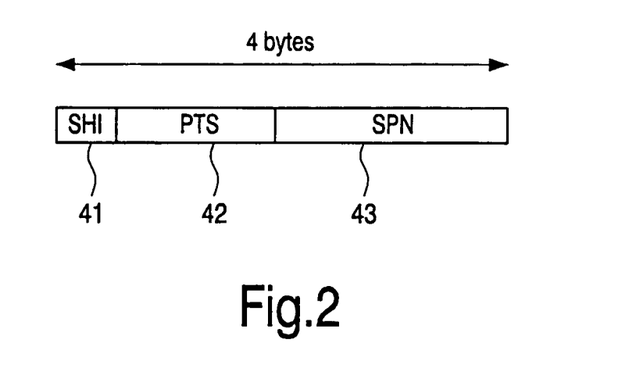
FIG. 2 shows an example of a structure of the block of information, which includes information related to the presence of the sequence header.

The signals processing unit 300 is adapted to convert the sequence of video data signals into the video data signals, which can be outputted to another apparatus (e.g. a television set) or to another processing unit not shown in the figure. Further, the read unit 302 is adapted to read a CPI from the record carrier 3. The signals processing unit 300 is further adapted to receive the CPI from the read unit 302 and to extract a block of information related to a characteristic point in the sequence of video data signals, as shown in FIG. 2.

The apparatus is further provided with an input unit 330 for receiving commands from a user. Such commands can be in a form of different playback commands, e.g. identifying a specific point in the sequence of video data signals at which playback should start. To that purpose, the processing unit 300 is, as an example, capable of finding position of an I-picture with a sequence header.

The CPI can be stored in a memory 332.

Figure 3:
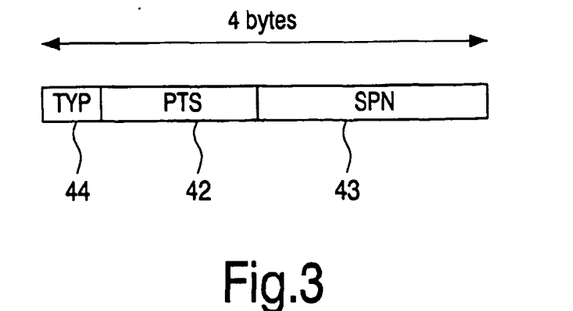
FIG. 3 shows an example of a structure of the block of information, which includes combined information related to a type of a picture and the presence of the sequence header.

A further embodiment of the apparatus for reproducing the sequence of video data signals is realized by adapting the signals processing unit 300 to process information contained in a block of information of a type shown in FIG. 3. This facilities smooth multi-speed trickplay operation of the apparatus by making use of additional entries in a CPI associated with P-pictures.

Figure 4:
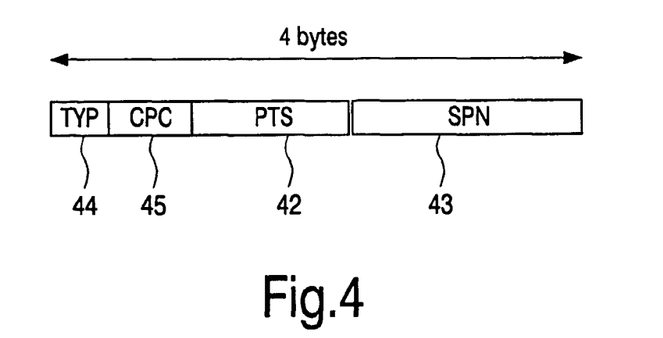
FIG. 4 shows an example of a structure of the block of information, which includes information related to a change of coding parameters.

Another embodiment of the apparatus for reproducing the sequence of video data signals according to the invention is realized by adapting the signals processing unit 300 to interpret information concerning change of coding parameters between consecutive sequence headers, from a block of information of a type shown in FIG. 4.

A next embodiment of the apparatus for reproducing the sequence of video data signals is realized by adapting the signals processing unit 300 in any of previous embodiments to receive the sequence of video data signals and/or a corresponding CPI via an input terminal 201. This enhances functionality of the apparatus by making it possible to process the sequence of video data signals received from e.g. the read unit 302, using the corresponding CPI received from e.g. Internet.

Yet another embodiment of the apparatus for reproducing the sequence of video data signals is realized by adapting the read unit 302 to perform reading of the sequence of video data signals and the corresponding CPI from the record carrier of a solid state memory type.

Figure 6:
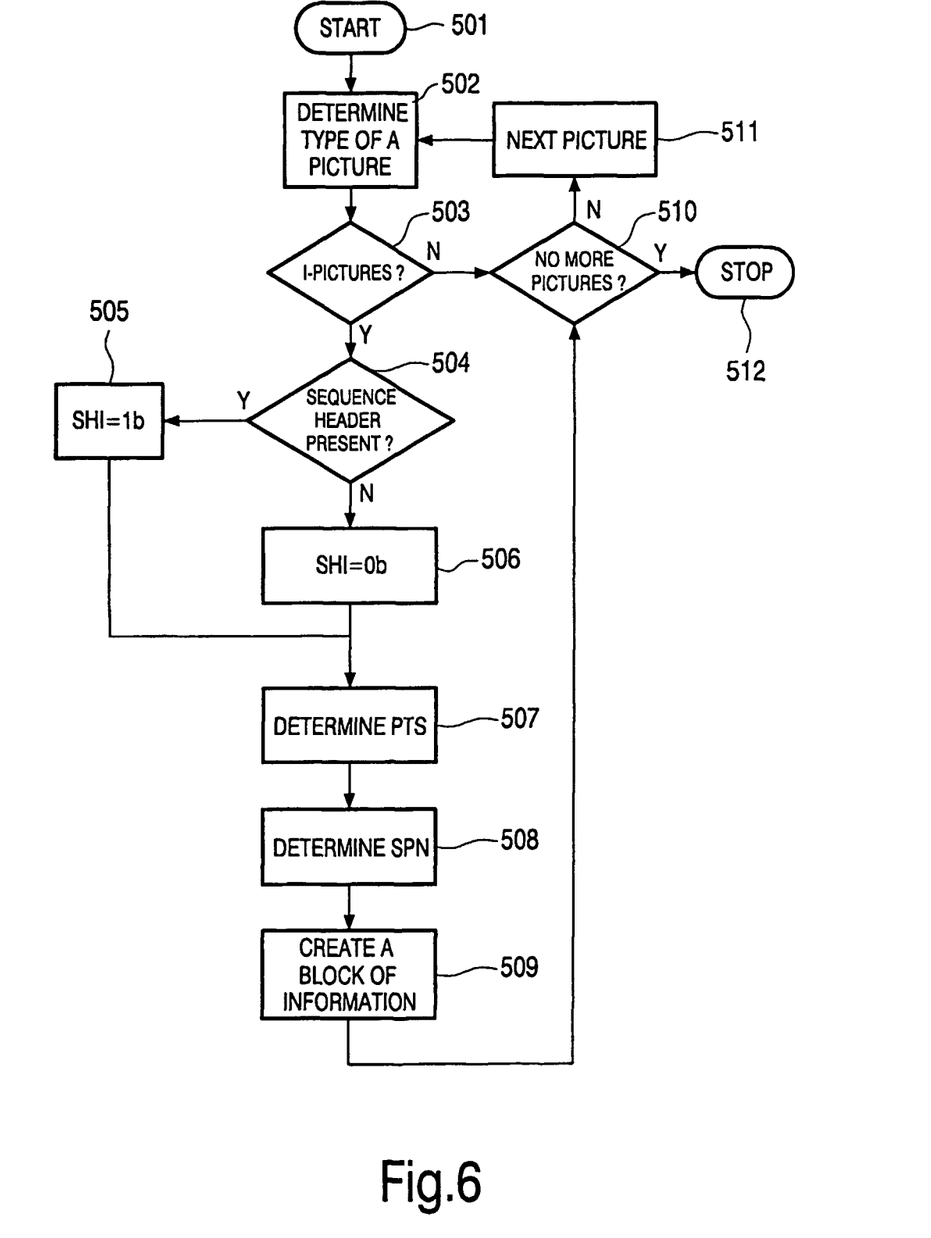
FIG. 6 shows an embodiment of the method of generating a CPI with the structure of the block of information as shown in FIG. 2.

FIG. 6 shows an embodiment of the method of generating a CPI, in accordance with the invention and corresponding to the block of information as shown in FIG. 2. In step 502 a type of a picture is determined. If a picture is the I-picture, a presence of the sequence header is checked in step 504. If the sequence header precedes the I-picture a value of the sequence header indicator 41 SHI is set to binary '1' in step 505, otherwise SHI is set to binary '0' in step 506. In step 507 a value of the presentation time stamp 42 PTS is determined. In step 508 a value of the source packet number 43 SPN is determined. The block of information is created in step 509. In step 510 it is checked whether there are more pictures in the sequence of video data. If there are more pictures, next picture is taken to analysis in step 511.

Figure 7:
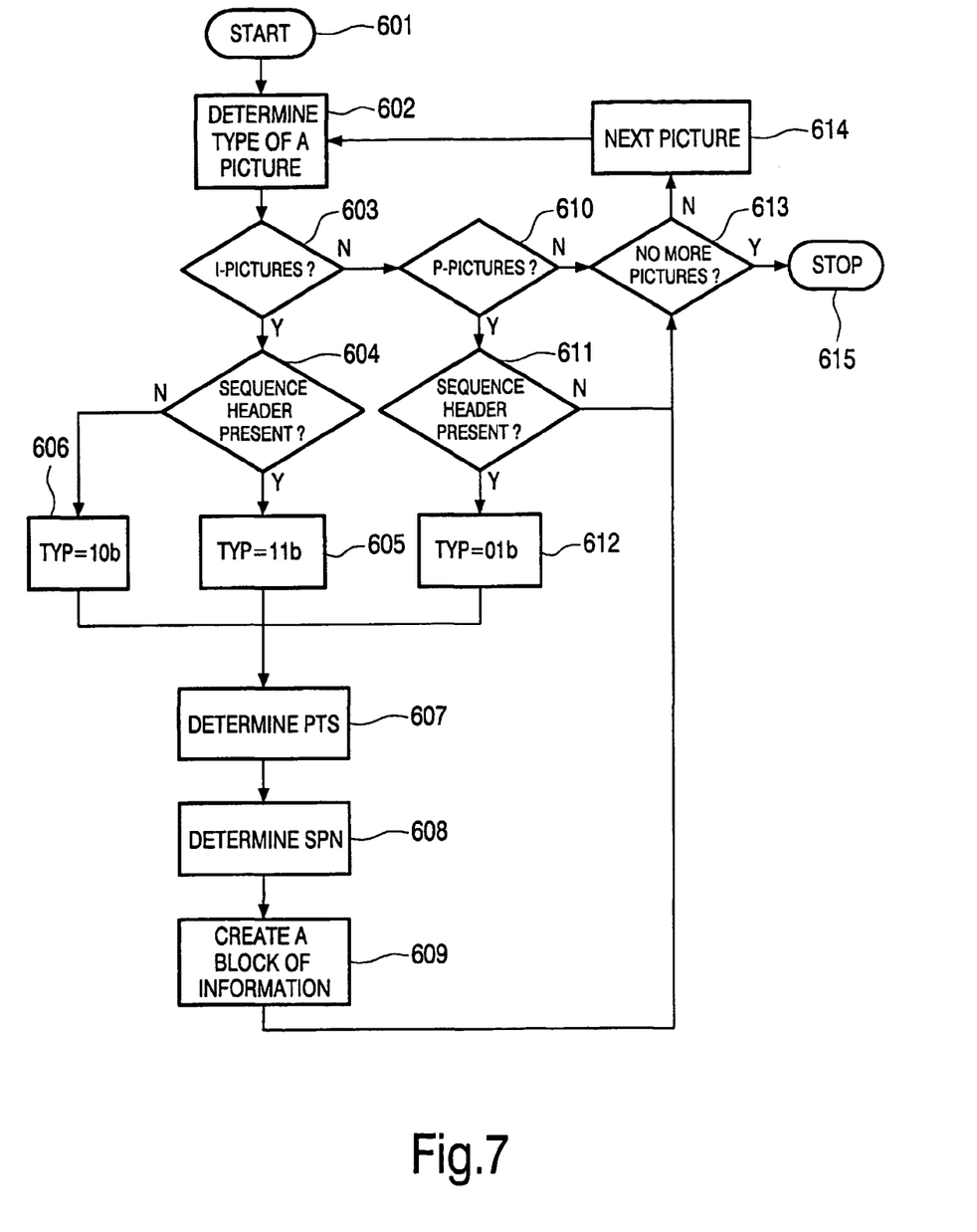
FIG. 7 shows an embodiment of the method of generating a CPI with the structure of the block of information as shown in FIG. 3.

FIG. 7 shows another embodiment of the method of generating a CPI, in accordance with the invention and corresponding to the block of information as shown in FIG. 3. In step 602 a type of a picture is determined. If a picture is the I-picture, a presence of the sequence header is checked in step 604. If the sequence header precedes the I-picture a value of the picture type indicator 44 TYP is set to binary '3' in step 605, otherwise TYP is set to binary '2' in step 606. If a picture is the P-picture, a presence of the sequence header is checked in step 611. If the sequence header precedes the P-picture a value of the picture type indicator 44 TYP is set to binary '1' in step 612. In step 607 a value of the presentation time stamp 42 PTS is determined. In step 608 a value of the source packet number 43 SPN is determined. The block of information is created in step 609. In step 613 it is checked whether there are more pictures in the sequence of video data. If there are more pictures, next picture is taken to analysis in step 614.

Figure 8:
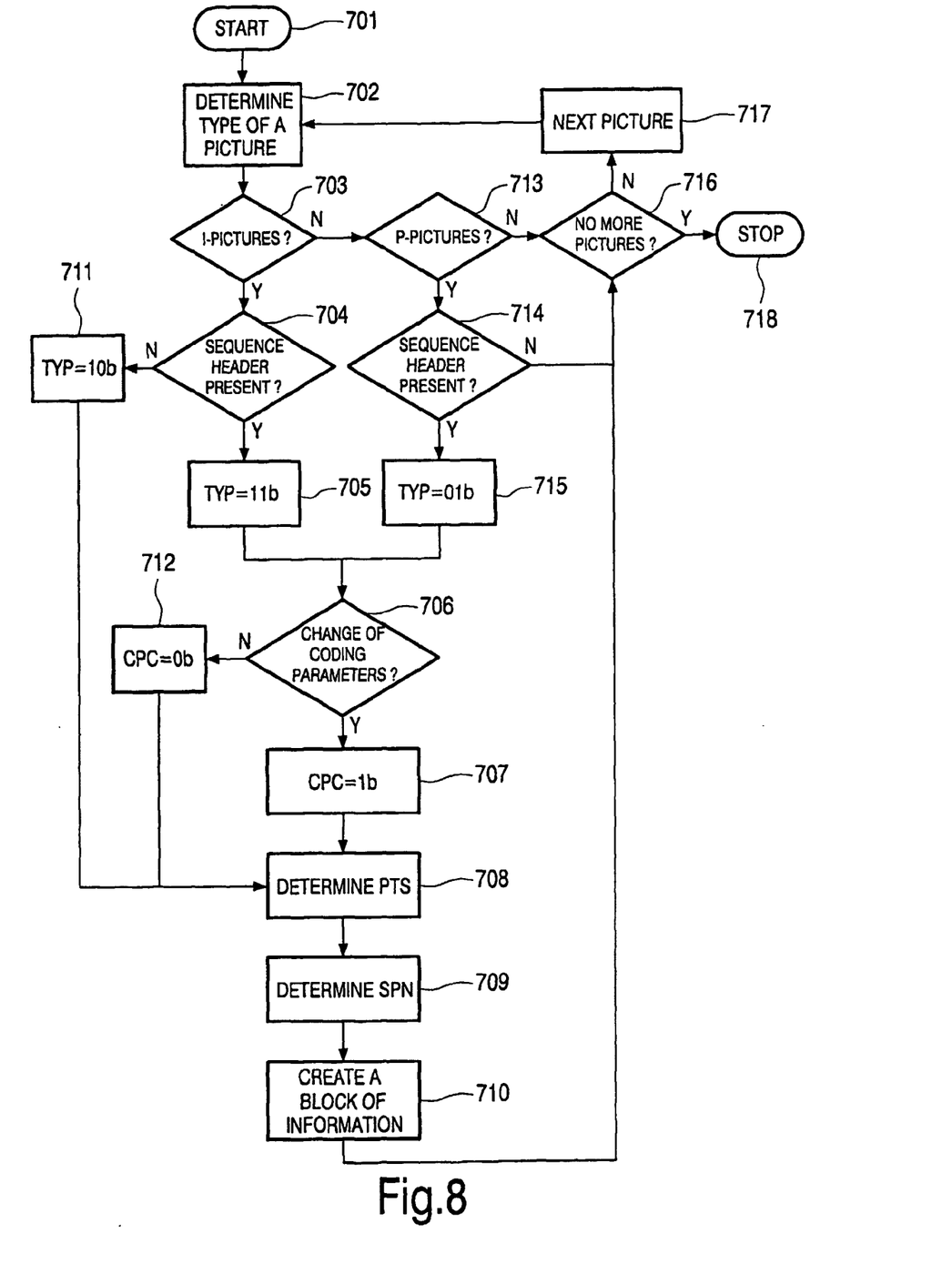
FIG. 8 shows an embodiment of the method of generating a CPI with the structure of the block of information as shown in FIG. 4.

FIG. 8 shows next embodiment of the method of generating a CPI, in accordance with the invention and corresponding to the block of information as shown in FIG. 4. In step 702 a type of a picture is determined. If a picture is the I-picture, a presence of the sequence header is checked in step 704. If the sequence header precedes the I-picture a value of the picture type indicator 44 TYP is set to binary '3' in step 705, otherwise TYP is set to binary '2' in step 711. If a picture is the P-picture, a presence of the sequence header is checked in step 714. If the sequence header precedes the P-picture a value of the picture type indicator 44 TYP is set to binary '1' in step 715. In step 706 it is checked whether there is a change of coding parameters between consecutive sequence headers. In case of changes in coding parameters, a value of coding parameters change indicator 45 CPC is set to binary '1', otherwise its value is set to binary '0'. In step 708 a value of the presentation time stamp 42 PTS is determined. In step 709 a value of the source packet number 43 SPN is determined. The block of information is created in step 710. In step 716 it is checked whether there are more pictures in the sequence of video data. If there are more pictures, next picture is taken to analysis in step 717.

Figure 9:
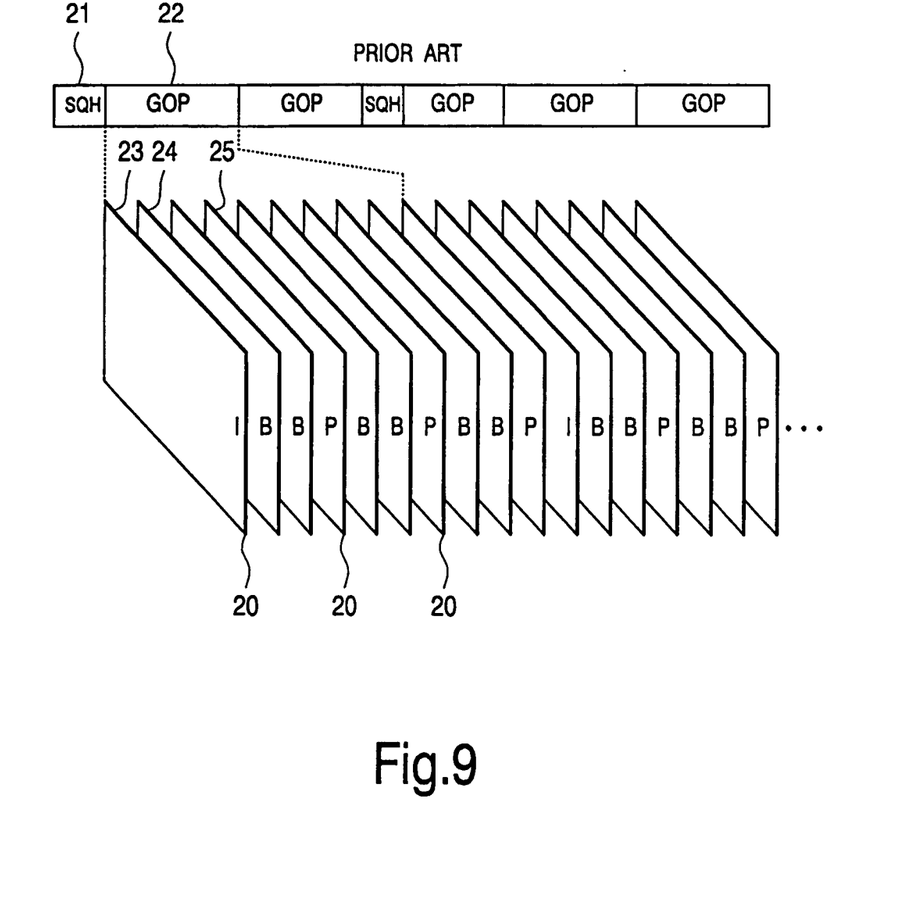
FIG. 9 shows a fragment of the sequence of video data signals with pictures, pointers to which can be included in a CPI according to the known method.

FIG. 9 shows a fragment of the sequence of video data signals with pictures, pointers to which can be included in a CPI according to the known method. The sequence of video data signals comprises group of pictures 22 (GOP) consisting of information of a plurality of pictures. Each GOP starts with an I-picture 23 (I) and can contain P-pictures 25 (P) and B-pictures 24 (B). Sequence headers 21 are indicated by SHQ. In FIG. 9, reference 20 denotes pictures pointers to which can be included in the CPI.

Figure 10:
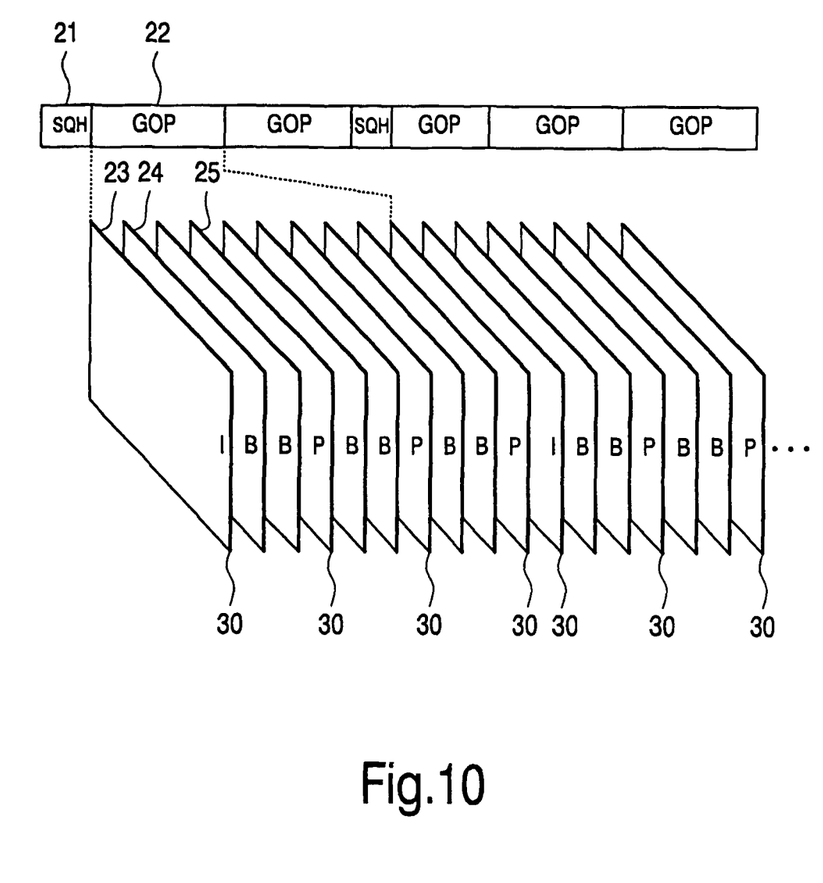
FIG. 10 shows a fragment of the sequence of video data signals with pictures, pointers to which can be included in a CPI according to the invention.

FIG. 10 shows a fragment of the sequence of video data signals with pictures, pointers to which can be included in a CPI according to the invention. These pictures are denoted by reference 30.

Whilst the invention has been described with reference to preferred embodiments thereof, it is to be understood that these are not limitative examples. Thus, various modifications may become apparent to those skilled in the art, without departing from the scope of the invention, as defined by the claims. Further, the invention lies in each and every novel feature or combination of features described above. It is noted, that the invention may be implemented by means of a general purpose processor executing a computer program or by dedicated hardware or by a combination of both, and that in this document the word "comprising" does not exclude the presence of other elements or steps than those listed and the word "a" or "an" preceding an element does not exclude the presence of a plurality of such elements, that any reference signs do not limit the scope of the claims, that "means" may be represented by a single item or a plurality and that several "means" may be represented by the same item of hardware.

The invention claimed is:

1. An apparatus for recording a sequence of video data signals on a record carrier, the sequence of video data signals comprising pictures of an intra-picture type coded without reference to other pictures and pictures of an inter-picture type coded with reference to other pictures, the apparatus comprising:
    input means for receiving video data signals;
    generating means for generating characteristic point information signals, the characteristic point information signals identifying a characteristic point in the sequence of video data signals, the characteristic point being related to a picture selected from the pictures of the intra-picture type and the pictures of the inter-picture type, the characteristic point information signals comprising a block of information, the block of information comprising:
    position data defining a position of the characteristic point in the sequence of video data signals; and
    identification data identifying the characteristic point;
    processing means for processing the characteristic point information signals for a plurality of characteristic points into a sequence of characteristic points information signals; and
    writing means for writing the sequence of video data signals and the sequence of characteristic points information signals on the record carrier;
    wherein the generating means are designed to generate the characteristic point information signals, in which the identification data comprises information related to presence of a sequence header, the related information comprising a sequence header indicator for indicating whether the sequence header precedes an intro-picture type or an inter-picture type, the sequence header comprising information defining coding parameters for the sequence of video data signals, and
    wherein the identification data further comprises information including a presentation time stamp specifying a time when a particular picture is to be presented in the sequence of video data and a packet number specifying an address where the characteristic point is located in the sequence of video data.

2. An apparatus as claimed in claim 1, wherein the generating means are designed to generate the characteristic point information signals, in which the identification data further comprises information related to one of the following conditions:
    the picture is of the intra-picture type and is preceded by the sequence header;
    the picture is of the intra-picture type without the sequence header;
    the picture is of the inter-picture type and is preceded by the sequence header.

3. An apparatus as claimed in claim 1, wherein the record carrier is a disc-shaped optical record carrier, and
    the writing means comprise an optical read/write head, a positioning means for positioning the optical read/write head and moving means for rotating the record carrier.

4. An apparatus for reproducing a sequence of video data signals comprising pictures of an intra-picture type coded without reference to other pictures and pictures of an inter-picture type coded with reference to other pictures, able to use for the sequence of video data signals a corresponding sequence of characteristic points information signals comprising a characteristic point information signals for a plurality of characteristic points, the characteristic point information signals identifying a characteristic point in the sequence of video data signals, the characteristic point being related to a picture selected from the pictures of the intra-picture type and the pictures of the inter-picture type, the characteristic point information signals comprising a block of information which comprises:
    position data defining a position of the characteristic point in the sequence of video data signals;
    identification data identifying the characteristic point; comprising:
        input means for receiving the sequence of video data signals and the corresponding sequence of characteristic points information signals;
        extracting means for extracting the block of information from the sequence of characteristic points information signals;
        processing means for processing the sequence of video data signals into video data signals using the block of information, the block information comprising identification data comprising information related to presence of a sequence header, the related information comprising a sequence header indicator for indicating whether the sequence header precedes an intro-picture type or an inter-picture type, the sequence header comprising information defining coding parameters for the sequence of video data signals, the identification a particular picture to be presented in the sequence of video data and a packet number specifying an address where the characteristic point is located in the sequence of video data;
    wherein the extracting means are designed to retrieve the identification data comprising information related to presence of a sequence header, the sequence header comprising information defining coding parameters for the sequence of video data signals; and
    the processing means are designed to use information related to presence of the sequence header
    wherein the extracting means are designed to retrieve the identification data comprising information related to a change of the coding parameters between consecutive sequence headers; and the processing means are designed to use information related to the change of the coding parameters.

5. An apparatus as claimed in claim 4, wherein
the extracting means are designed to retrieve the identification data further comprising information related to one of the following conditions:
the picture is of the intra-picture type and is preceded by the sequence header;
the picture is of the intra-picture type without the sequence header; and
the picture is of the inter-picture type and is preceded by the sequence header; and the processing means are designed to use information related to these conditions.

6. An apparatus as claimed in claim 4, wherein the input means are designed to receive the sequence of video data signals and the corresponding sequence of characteristic points information signals from a record carrier.

7. An apparatus as claimed in claim 6, wherein the input means are designed to receive the sequence of video data signals and the corresponding sequence of characteristic points information signals from a disc-shaped optical record carrier.

8. A method of generating and/or recording a sequence of information signals concerning characteristic points in a sequence of video data signals comprising pictures of an intra-picture type coded without reference to other pictures and pictures of an inter-picture type coded with reference to other pictures, in which for a characteristic point related to a picture selected from the pictures of the intra-picture type and the pictures of the inter-picture type, said method comprising the steps of:

generating, on a recording device, a block of information, wherein the step of generating includes
defining a position of the characteristic point in the sequence of video data signals;
identifying the characteristic point;
wherein the block of information is generated to comprise in the identification data information related to presence of a sequence header, the sequence header comprising information defining coding parameters for the sequence of video data signals, the related information comprising a sequence header indicator for indicating whether the sequence header precedes an intra-picture type or an inter-picture type, the sequence header comprising information defining coding parameters for the sequence of video data signals, the identification data further comprises information including a presentation time stamp specifying a time when a particular picture is to be presented in the sequence of video data and a packet number specifying and address where the characteristic point is located in the sequence of video data.

9. A method as claimed in claim 8 wherein the step of generating the block of information includes identification data information related to one of the following conditions:
the picture is of the intra-picture type and is preceded by the sequence header;
the picture is of the intra-picture type without the sequence header;
the picture is of the inter-picture type and is preceded by the sequence header.

* * * * *